US010218671B2

(12) United States Patent
Pang (10) Patent No.: US 10,218,671 B2
(45) Date of Patent: Feb. 26, 2019

(54) DYNAMIC MEDIA ACCESS CONTROL ADDRESS ALLOCATION AND LEASING FOR WIRELESS NETWORK

(71) Applicant: Cisco Technology, Inc., San Jose, CA (US)

(72) Inventor: Tak Ming Francis Pang, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 163 days.

(21) Appl. No.: 15/263,870

(22) Filed: Sep. 13, 2016

(65) Prior Publication Data

US 2018/0077111 A1 Mar. 15, 2018

(51) Int. Cl.
G06F 15/177 (2006.01)
H04L 29/12 (2006.01)

(52) U.S. Cl.
CPC ...... H04L 61/2007 (2013.01); H04L 61/2061 (2013.01); H04L 61/6022 (2013.01)

(58) Field of Classification Search
CPC ............. H04L 61/2007; H04L 61/2061; H04L 61/6022
See application file for complete search history.

(56) References Cited

U.S. PATENT DOCUMENTS

| | | | | |
|---|---|---|---|---|
| 7,529,851 B1 * | 5/2009 | Haley | ............... | H04L 29/12264 709/220 |
| 7,831,996 B2 * | 11/2010 | Dholakia | ................ | H04L 63/08 713/168 |
| 8,559,369 B2 * | 10/2013 | Barkan | ................ | H04W 12/08 370/328 |
| 8,767,526 B1 * | 7/2014 | Jagannatharao | ...... | H04L 63/205 370/216 |
| 2003/0035442 A1 | 2/2003 | Eng | | |
| 2005/0188241 A1 | 8/2005 | Cabezas et al. | | |
| 2006/0120317 A1 | 6/2006 | Zheng | | |
| 2008/0186965 A1 | 8/2008 | Zheng | | |
| 2010/0110975 A1 | 5/2010 | Cagenius | | |
| 2014/0119232 A1 * | 5/2014 | Gurewitz | ............. | H04W 84/18 370/254 |
| 2014/0279862 A1 * | 9/2014 | Dietz | ................. | H04L 41/0806 707/609 |
| 2015/0204964 A1 | 7/2015 | Hirano et al. | | |
| 2015/0381565 A1 | 12/2015 | Thaler et al. | | |
| 2016/0100028 A1 * | 4/2016 | Erdmann | ............... | G08C 17/00 709/219 |
| 2016/0165523 A1 * | 6/2016 | Guo | .................... | H04L 12/6418 370/254 |
| 2017/0013449 A1 * | 1/2017 | Raman | .................. | H04W 12/06 |
| 2017/0142064 A1 * | 5/2017 | Weis | .................. | H04L 61/6022 |
| 2017/0237815 A1 * | 8/2017 | Arsenault | ............... | H04W 4/70 709/217 |

\* cited by examiner

Primary Examiner — Jonathan A Bui
(74) Attorney, Agent, or Firm — Meunier Carlin & Curfman LLC (57) ABSTRACT

Presented herein are systems and methods of dynamically allocating and leasing MAC addresses in a wireless network that ensures a unique MAC address is assigned to a computing device. The exemplified systems and methods ensure that the dynamically assigned MAC address is unique for a given network and that the MAC address is assigned to a give client wireless device prior to the client being granted access to the network and prior to a communication session being established.

21 Claims, 9 Drawing Sheets

DYNAMIC MEDIA ACCESS CONTROL ADDRESS ALLOCATION AND LEASING FOR WIRELESS NETWORK

TECHNICAL FIELD

The present disclosure relates to networking of wireless devices.

BACKGROUND

Media Access Control (MAC) addresses are unique identifiers associated with a given network device and each defines a network interface for a network device on a physical network. MAC addresses are also referred to as burned-in address (BIA) or an Ethernet hardware address (EHA) or a physical address. Conventional network devices are permanently assigned, by the device manufacturer, a unique MAC address, which is used in authentication processes to gain access to a network.

As the number of network devices continue to grow, the number of available MAC addresses that can be used by device manufacturers are also diminished.

DESCRIPTION OF EXAMPLE EMBODIMENTS

Overview

Presented herein are systems and methods of dynamically allocating and leasing MAC addresses in a wireless network that ensures a unique MAC address is assigned to a computing device. The exemplified systems and methods ensure that the dynamically assigned MAC address is unique for a given network and that the MAC address is assigned to a given client wireless device prior to the client being granted access to the network and prior to a communication session being established. Notably, the exemplified systems and methods facilitate use of addresses that can be structured according to conventional MAC addresses in which such addresses can be used among multiple devices located in different networks. The conventional MAC address is extended by a MAC Pool identifier or MAC Pool address associated with a MAC usage domain to form a unique identifier for a given wireless device in a network that is compatible with existing IEEE-802.11 standards.

The exemplified methods and systems facilitate a dynamic MAC address leasing and allocation operation that may be used with existing IEEE-802.11 protocol communication. In some embodiments, the exemplified methods and systems facilitate interoperation with the IEEE 802.11r standard, e.g., when roaming and without the need to perform full 802.11x full re-authentication with a new MAC address.

In an aspect, a method is disclosed of operating a network (e.g., an access point in the network, also referred to as a wireless access point "WAP") to allocate dynamic media access control (MAC) address (also referred to herein as "dynamically assignable MAC address"). The method includes, in the network, broadcasting, via an access point (AP), on a periodic basis, a packet (e.g., a beacon frame) comprising i) a MAC Pool identifier associated with the network and ii) one or more dynamic MAC addresses associated with the network (e.g., wherein each of the one or more dynamic MAC addresses is unique within the network), wherein a given dynamic MAC address of the one or more dynamic MAC addresses is assignable to a computing device that receives the packet. The method further includes, in response to receipt of a packet response (e.g., a probe request) from a given computing device (e.g., a client), wherein the packet response includes a broadcasted unassigned dynamic MAC address of the one or more broadcasted dynamic MAC addresses, determining (e.g., with a controller that maintains a list of plurality of assigned dynamic MAC addresses or a master AP that does the same, wherein the master AP downloads the available list of dynamic MAC addresses from the controller) whether the broadcasted dynamic MAC address has been associated with (or not associated with) a computing device in the network; and in response to the determination (e.g., of the broadcasted dynamic MAC address being available), associating the broadcasted dynamic MAC address with the given computing device and adding the associating the broadcasted dynamic MAC address to the list of plurality of assigned dynamic MAC addresses, wherein subsequent packets (e.g., for authentication and subsequent use) communicated to the given computing device are based on the allocated dynamic MAC address.

In some embodiments, the MAC Pool identifier is a MAC address associated with the controller (e.g., wherein the MAC address associated with the controller is originally assigned by a manufacturer of the controller, e.g., and via a Registration Authority Standard Group MAC Address) or is a configurable identifier that is specified by an administrator.

In some embodiments, the method includes, upon the designation of the broadcasted dynamic MAC addresses as the allocated dynamic MAC address that is associated with the given computing device, initiating (e.g., at the controller) an expiration counter or logging an expiration time.

In some embodiments, the method includes, upon expiration of the allocated dynamic MAC address associated with the given computing device, removing the associating the broadcasted dynamic MAC address from the list of plurality of assigned dynamic MAC addresses.

In some embodiments, the packet response includes the broadcasted dynamic MAC address and a token parameter (e.g., a randomly generated token), and the method includes, in response to receipt of the packet request from a second computing device, transmitting, via the access point, the token parameter with the broadcasted dynamic MAC address, wherein said transmission confirms an association between the broadcasted dynamic MAC address and the given computing device that transmitted the token parameter in the packet response.

In some embodiments, subsequent packets communicated to the given computing device, across a second access point (e.g., roaming), are based on the allocated dynamic MAC address (e.g., if the MAC Pool identifier of the first access point and the second access point are the same).

In some embodiments, the method includes, in the network, broadcasting, via a second access point (having a second BSSID that is different from the BSSID of the first access point), a second packet (e.g., a second beacon frame) comprising i) the MAC Pool identifier associated with the network and ii) the one or more dynamic MAC addresses associated with the network (e.g., wherein each of the one or more dynamic MAC addresses is same with the network), wherein the access point is located at a first location and the second access point is located at a second location, and wherein the first location is not the same as the second location (e.g., at disjointed location that are not in proximity to one another).

In some embodiments, the packet response comprises a probe request.

In some embodiments, the network is associated with a single common SSID.

In some embodiments, the network is associated with a plurality of SSIDs, wherein a plurality of access points associated with the plurality of SSIDs use the MAC Pool identifier as a common identifier.

In some embodiments, the allocated dynamic MAC address is unique among the plurality of SSIDs.

In some embodiments, the method includes, in response to receipt of a second packet associated with a renewal of a lease of the allocated dynamic MAC address, initiating (e.g., at the controller) a new expiration counter or logging a new expiration time (e.g., associated with a new lease of the allocated dynamic MAC address).

In some embodiments, each of the one or more dynamic MAC addresses is originally assigned by a manufacturer and is designated as a dynamic MAC address by a Registration Authority Standard Group MAC Address.

In some embodiments, each of the one or more dynamic MAC addresses is assignable, via a graphical user interface associated with the controller, by a user (e.g., the manufacturer or owner of the controller or AP).

In some embodiments, the one or more dynamic MAC addresses is formatted according to MAC-48 name space.

In another aspect, a method is disclosed of operating a computing device (e.g., a client) in a network that allocates dynamic media access control (MAC) address. The method includes, in the network, in response to receiving a broadcasted a packet (e.g., a beacon frame) comprising i) a MAC Pool identifier associated with the network and ii) one or more dynamic MAC addresses associated with the network (e.g., wherein each of the one or more dynamic MAC addresses is unique within the network), storing, at the computing device, a dynamic MAC address of the one or more dynamic MAC addresses; and transmitting, from the computing device, to an access point associated with the network, a packet (e.g., a probe request) comprising the stored dynamic MAC address.

In some embodiments, the method includes transmitting, from the computing device, to the access point, authentication packets, wherein the authentication packets comprises the stored dynamic MAC address.

In some embodiments, the method includes transmitting, from the computing device, to a second access point, second authentication packets, wherein the second authentication packets comprises the stored dynamic MAC address (e.g., if the MAC Pool identifier broadcasted by the second access point matches the MAC Pool identifier broadcasted by the first access point).

In some embodiments, each the one or more dynamic MAC addresses is formatted according to MAC-48 name space.

In another aspect, an apparatus is disclosed. The apparatus (e.g., an access point) includes a processor; and a memory having instructions stored thereon, wherein execution of the instructions, cause the processor to: broadcast, on a periodic basis, a packet (e.g., a beacon frame) comprising i) a MAC Pool identifier associated with the network and ii) one or more dynamic MAC addresses associated with the network (e.g., wherein each of the one or more dynamic MAC addresses is unique within the network), wherein a given dynamic MAC address of the one or more dynamic MAC addresses is assignable to a computing device that receives the packet; in response to receipt of a packet response (e.g., a probe request) from a given computing device (e.g., a client), wherein the packet response includes a broadcasted unassigned dynamic MAC address of the one or more broadcasted dynamic MAC addresses, determine (e.g., solely or via coordination with a controller) whether the broadcasted dynamic MAC address has been associated with (or not associated with) a computing device in the network; and in response to the determination (e.g., of the broadcasted dynamic MAC address being available), associate the broadcasted dynamic MAC address with the given computing device and adding the associating the broadcasted dynamic MAC address to the list of plurality of assigned dynamic MAC addresses, wherein subsequent packets (e.g., for authentication and subsequent use) communicated to the given computing device are based on the allocated dynamic MAC address.

Example Embodiment

Figure 1:
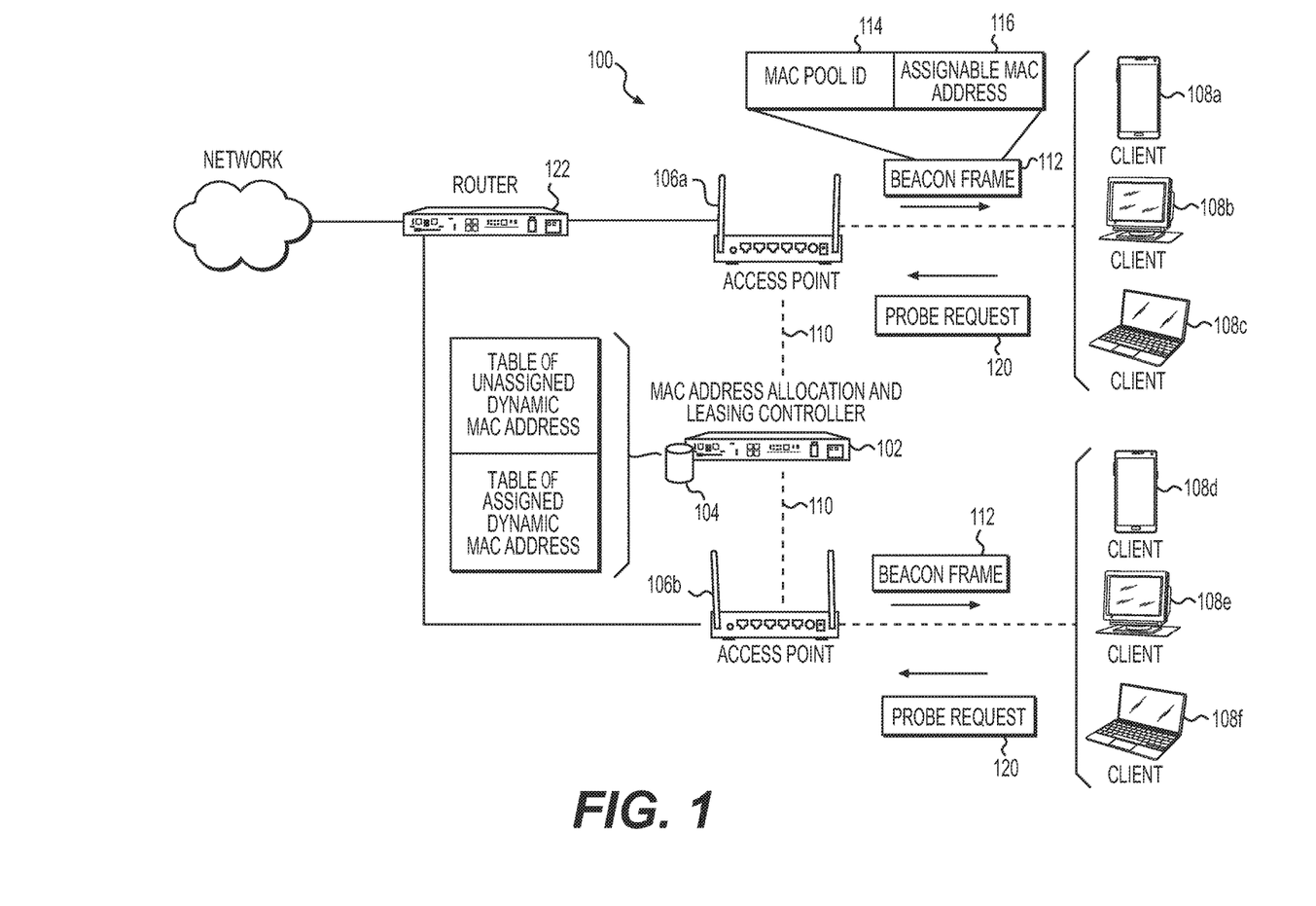
FIG. 1 is a diagram illustrating a system that allocates and/or leases dynamically assignable MAC addresses in conjunction with a MAC Pool address (also referred herein as a "MAC Pool ID") in a wireless network, in accordance with an illustrative embodiment.

FIG. 1 is a diagram illustrating a system 100 that allocates and/or leases dynamically assignable MAC addresses in conjunction with a MAC Pool address in a wireless network, in accordance with an illustrative embodiment.

The system 100 includes a controller 102 that maintains a list 104 (e.g., in a database or a table) of unassigned dynamic MAC addresses or a list 104 of assigned dynamic MAC addresses (or both) for a given MAC domain. The controller 102 operates with one or more access points 106 (shown as access point 106a and access point 106b) in a local network or a wide area network that serves a plurality of client devices 108 (shown as devices 108a, 108b, 108c, 108d, 108e, and 108f) by distributing, in whole, or in part, a set of dynamically assignable MAC addresses to each connected access point 106 from the list 106.

The controller 112 establishes a MAC usage domain that is defined by a MAC Pool identifier or address, and the MAC Pool identifier is advertised on a beacon, probe response, or management frame design by the access point for MAC allocation. The MAC Pool identifier is advertised together with available one or more dynamic MAC addresses. Within a usage domain (which may be shared among disjointed locations), a client wireless device with a valid leased MAC address (namely, a dynamically assigned MAC address) is able to roam among multiple access points in the domain.

To assign a client wireless device with a dynamic MAC address, the controller 102 transmits one or more dynamically assignable MAC addresses, from a pool of available addresses maintained by the controller 102, to the access point 106 via communication link 110. The access point 106, in turn, advertises, in a beacon frame 112, a MAC Pool address 114 (shown as "MAC Pool ID" 114) and one or more assignable MAC addresses 116 to the client wireless devices 108. In some embodiments, rather than a beacon frame, the MAC Pool address 114 and one or more assignable MAC addresses 116 are sent in a management frame. The access point 106, in some embodiments, broadcasts the beacon frame 112 on a periodic basis (e.g., about every 15 seconds, about every 30 seconds, about every 1 minute, about every 5 minutes).

Once the broadcasted beacon frame (or management frame) is received by the client wireless devices 108 in a broadcast range of the access point 106, one of the client wireless devices 108 can transmit a probe request 120 (or management frame) that includes one of the broadcasted MAC address in the beacon frame 112. The probe request 120 (or management frame) serves as a request to the access point 106 to assign the broadcasted MAC address to the client wireless device 108. In some embodiments, the access point 106 transmits a message (e.g., a management frame or a probe response) to acknowledge assignment of the broadcasted MAC address. In other embodiments, the access point 106 is configured to send a message (e.g., a management frame or a probe response) to the client wireless device 108 when the requested MAC address is no longer available— that is, the address has been assigned to another client wireless device. The use of the pool ID allows client devices to roam efficiently without MAC collision such as with a randomly assigned scheme.

Referring still to FIG. 1, the access point 106 operatively connects to a switch or router 122 (shown as "router 122") to form a local area network. The switch or router 122 provides connectivity and a wide-area network (e.g., the Internet). Other networking devices may be used in the local area network and the wide-area network, for example, to provide network address translation (NAT) services, firewall, etc.

In some embodiments, the controller 102 is housed in a cabinet (e.g., in a wiring closet) at a site associated with the MAC domain. The controller 102 may be a 1U server configured a rackmount. In other embodiments, the controller 102 is configured as a desktop server. The controller may be implemented in other form factors.

Figure 2:
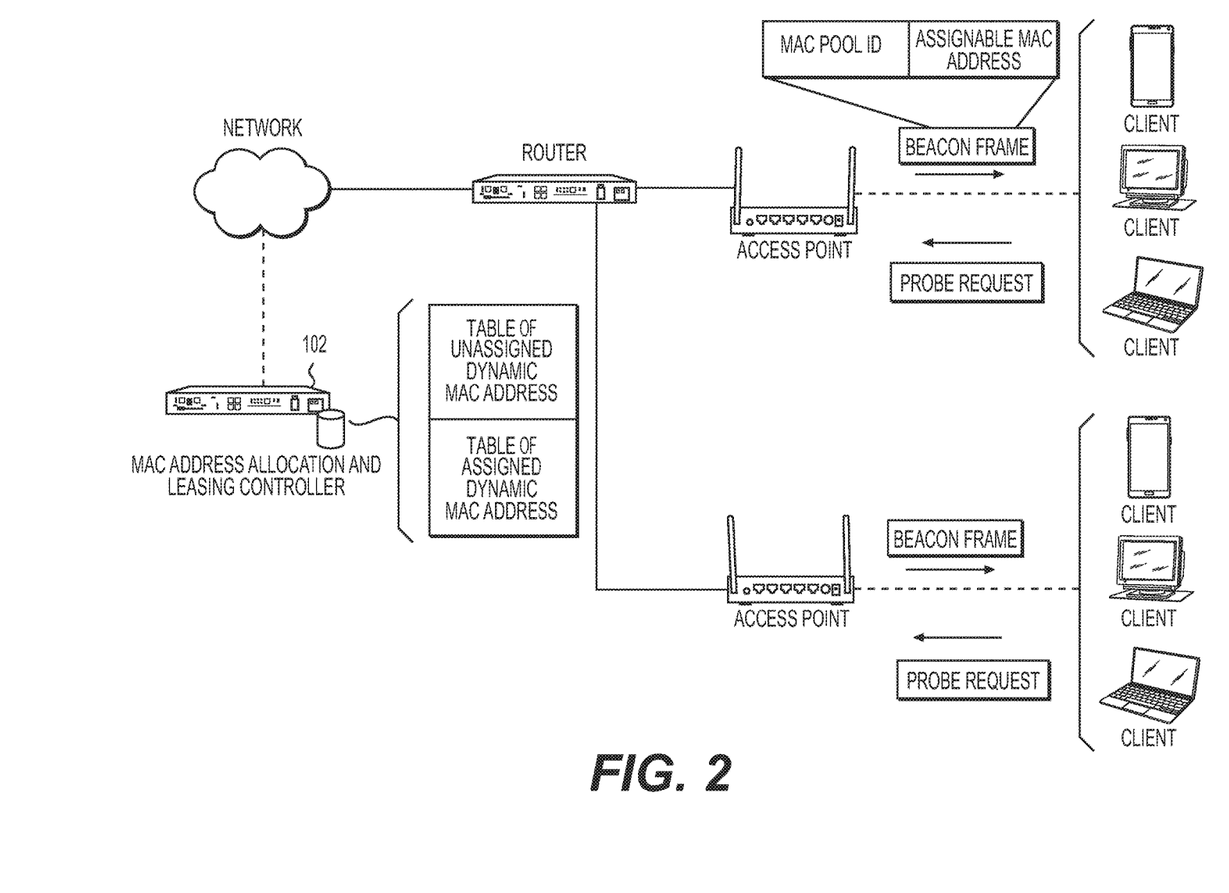
FIG. 2 is a diagram illustrating a system that allocates and/or leases dynamically assignable MAC addresses in conjunction with a MAC Pool address in a wireless network, in accordance with another illustrative embodiment.

In some embodiments, the controller is a cloud service or a server that is maintained in a network. FIG. 2 is a diagram illustrating a system that allocates and/or leases dynamically assignable MAC addresses in conjunction with a MAC Pool address in a wireless network, in accordance with another illustrative embodiment.

As shown in FIG. 2, the controller 102 is implemented as a server or as a computing resource on a private cloud, a public cloud, or a hybrid cloud. In some embodiments, the service is accessed by an API (application programming interface), e.g., to coordinate the assignment and expiration of dynamically assigned MAC addresses.

MAC Pool Identifier

As used herein, MAC Pool identifier and MAC Pool address are used interchangeably and refers to a unique identifier or address that is associated with a given network. The network may have one or more controllers that can share a MAC Pool identifier or MAC Pool Address.

In some embodiments, the MAC Pool identifier is an assigned MAC address of the controller. In embodiments in which multiple controllers are used in a given MAC domain, the MAC address of a master controller may be used or a MAC address of one of the controllers may be selected, e.g., by the network administrator, to be the MAC Pool identifier.

In some embodiments, the MAC Pool identifier is a unique symbol set that is dynamically assigned by a system administrator. In some embodiments, the MAC Pool identifier is a unique symbol set that is assigned by a given manufacturer or a cloud service provider.

In some embodiment, the MAC Pool identifier is a combination of a unique symbol set that is assigned by a given manufacturer (or a cloud service provider) and an identifier associated with the device in the network, e.g., a BSSID associated with an access point that had leased the MAC address to the client wireless device.

In some embodiment, the MAC Pool identifier is a combination of a unique symbol set that is assigned by a network administrator and an identifier associated with the device in the network, e.g., a BSSID associated with an access point that had leased the MAC address to the client wireless device.

Pool of dynamically assignable MAC Addresses

The exemplified systems and methods facilitate temporary assignment of a MAC address to a given client wireless device from a pool of dynamically assignable MAC addresses. The pool of MAC addresses is shared, in some embodiments, among a set of one or more controllers and pre-allocated and distributed, in part, among access points in the MAC domain on a needed-basis.

In some embodiments, the pool of dynamic MAC addresses includes about 500 or more addresses. In some embodiments, the pool of dynamic MAC addresses includes about 1,000 or more addresses. In some embodiments, the pool of dynamic MAC addresses includes about 2,000 or more addresses. In some embodiments, the pool of dynamic MAC addresses includes about 3,000 or more addresses. In some embodiments, the pool of dynamic MAC addresses includes about 4,000 or more addresses. In some embodiments, the pool of dynamic MAC addresses includes about 5,000 or more addresses. In some embodiments, the pool of dynamic MAC addresses includes about 6,000 or more addresses. In some embodiments, the pool of dynamic MAC addresses includes about 7,000 or more addresses. In some embodiments, the pool of dynamic MAC addresses includes about 8,000 or more addresses. In some embodiments, the pool of dynamic MAC addresses includes about 9,000 or more addresses. In some embodiments, the pool of dynamic MAC addresses includes about 10,000 or more addresses. In some embodiments, the pool of dynamic MAC addresses includes about 100,000 or more addresses. In some embodiments, the pool of dynamic MAC addresses includes about 1,000,000 or more addresses. The MAC addresses in the pool may include sequence blocks of addresses as well as individual addresses that are non-consecutive to one another.

In some embodiments, the pool of dynamically assignable MAC addresses include, in whole, or in part, unique addresses that are specific to a manufacturer to be used in a MAC leasing or dynamic MAC assignment scheme. That is, some or all of the addresses have been acquired by a manufacturer from a standard body that regulates the assignment of MAC addresses and the addresses are used by the manufacturer in a MAC leasing operation or on a temporary basis. MAC addresses are often acquired in blocks by device manufacturers from a standard governing body (namely, the Registration Authority Standard Group MAC Address) that maintains the available MAC addresses. To this end, the dynamically assignable MAC addresses is unique within a given MAC domain, but can be leased or temporarily assigned with another device in another MAC domain.

In some embodiments, the same pool, in whole, or in part, of dynamically assignable MAC addresses is used by different companies in a leasing scheme.

In some embodiments, the same pool, in whole, or in part, of dynamically assignable MAC addresses is used by in different MAC domains.

In some embodiments, the pool of dynamically assignable MAC addresses include, in whole, or in part, MAC addresses that have been statically assigned by the manufacturer to a set of devices.

Manufacturer supplied pools reduce the complexity during setup of a given MAC domain in providing a default set of one or more pools of dynamically assignable MAC addresses that can be used for the given MAC domain. In some embodiments, the pool of dynamically assignable MAC addresses is, in whole, or in part, customizable and selectable by a network administrator. For example, in some embodiments, a controller can present a network administrator with a plurality of pools of dynamically assignable MAC addresses during setup or configuration of the MAC domain. The controller may also present the network administrator with a user interface to individual select, add, or remove, dynamically assignable MAC addresses to a given MAC domain.

Figure 3:
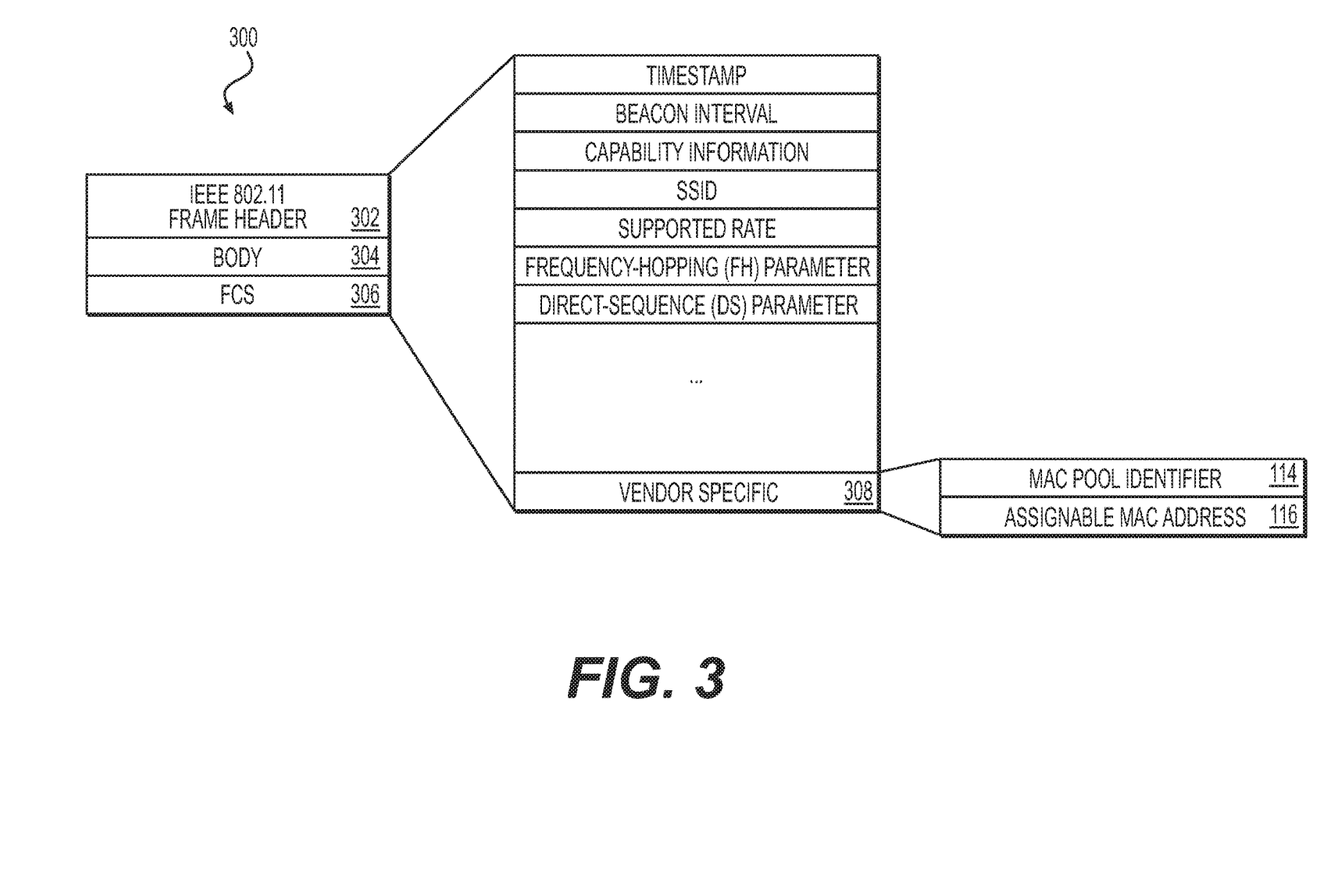
FIG. 3 is a diagram of an example beacon frame that includes a MAC Pool address and a dynamically assignable MAC address and is broadcasted by an access point (e.g., wireless access point) to advertise the dynamically assignable MAC address as being available/unassigned, in accordance with an illustrative embodiment.

Example Beacon Frame with MAC Pool Identifier and Dynamically Assignable MAC Address FIG. 3 is a diagram of an example beacon frame 300 that includes a MAC Pool address and a dynamically assignable MAC address that is broadcasted by an access point (e.g., a wireless access point) to advertise the dynamically assignable MAC address as being an available/unassigned to client wireless device, in accordance with an illustrative embodiment.

Beacon frames are one type of management frames in IEEE-802.11-based wireless local area networks (WLANs) and contain all the information about the network. Beacon frames are generally transmitted periodically in an infrastructure Basic service set (BSS) to announce the presence of a wireless LAN. As shown in FIG. 3, the beacon frame 300 includes an IEEE 802.11 frame header 302, a body 304, and a FCS 306. Within the body 304, the beacon frame 300 includes a vendor specific field 308 that includes the MAC Pool identifier or MAC Pool address 114 and the dynamically assignable MAC address 116.

The MAC Pool identifier or MAC Pool address 114, in some embodiments, is a 48-bit address (i.e., 6 octet) that is structured according to MAC-48 namespace or EUI-48 (Extended Unique Identifier-48) namespace as managed by the Institute of Electrical and Electronic Engineers (IEEE). In other embodiments, the MAC Pool identifier or MAC Pool address 114 is a 64 bit address (i.e., 8 octet) that is structured according to EUI-64 namespace as managed by the Institute of Electrical and Electronic Engineers (IEEE). In other embodiments, the MAC Pool address is a 7-octet address. In other embodiments, the MAC Pool address is a 9-octet address. In other embodiments, the MAC Pool address is a 10-octet address. In other embodiments, the MAC Pool address is a user-defined length address that is at least 3 octets in length.

Each dynamically assignable MAC address 116 of the pool thereof, in some embodiments, is a 48-bit address (i.e., 6 octet) that is structured according to MAC-48 namespace or EUI-48 namespace as managed by the Institute of Electrical and Electronic Engineers (IEEE). In other embodiments, each dynamically assignable MAC address 116 of a pool thereof is a 64 bit address (i.e., 8 octet) that is structured according to EUI-64 namespace as managed by the Institute of Electrical and Electronic Engineers (IEEE). In other embodiments, each dynamically assignable MAC address of the pool thereof is a 7-octet address. In other embodiments, each dynamically assignable MAC address of the pool thereof is a 9-octet address. In other embodiments, each dynamically assignable MAC address of the pool thereof is a 10-octet address. In other embodiments, each dynamically assignable MAC address of the pool thereof is a user-defined length address that is at least 3 octets in length.

The dynamically assignable MAC address 116, in some embodiments, is a 48-bit address (i.e., 6 octet) that is structured according to MAC-48 or EUI-48. In other embodiments, the dynamically assignable MAC address 116 is a 64 bit address (i.e., 8 octet) that is structured according to EUI-64 standards.

Figure 4:
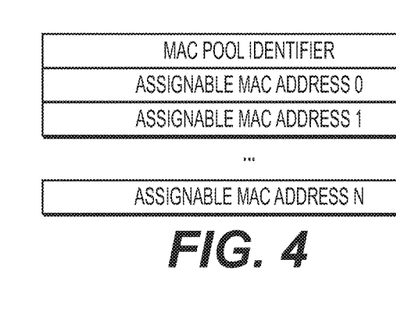
FIG. 4 is a diagram of an example portion of a beacon frame of FIG. 3 with multiple available/unassigned dynamically assignable MAC addresses, in accordance with an illustrative embodiment.

FIG. 4 is a diagram of an example portion of a beacon frame of FIG. 3 with multiple available/unassigned dynamically assignable MAC addresses (shown as 116a, 116b, and 116c), in accordance with an illustrative embodiment.

Referring still to FIG. 3, the beacon frame body 304 includes a timestamp field, a beacon interval field, a capability field, a service set identifier (SSID) field, and a support rates field. In some embodiments, the beacon frame body 304 includes optional fields, such as, but not limited to, a frequency-hopping parameter set field, a DSSS parameter set field, a CF parameter set field, an IBSS parameter set field, a traffic indication map (TIM) field, and a country field. Other beacon frame body 304 components is described in the "Part 11: Wireless LAN Medium Access Control (MAC) and Physical Layer (PHY) Specifications," published by the IEEE Standards Association, and is incorporated by reference herein in its entirety.

Probe Request to Request Assignment of a Dynamically Assignable MAC Address

Figure 5:
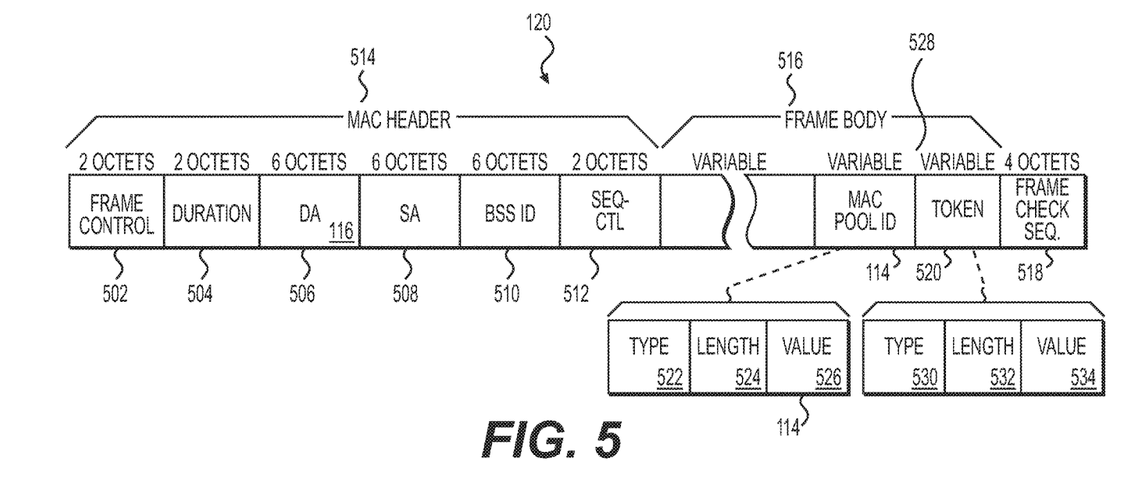
FIG. 5 is a diagram of an example probe request of FIG. 1 generated by a client wireless device to request assignment of a given broadcasted dynamically assignable MAC address, in accordance with an illustrative embodiment.

FIG. 5 is a diagram of an example probe request 120 of FIG. 1 generated by a client wireless device 108 to request assignment of a given broadcasted dynamically assignable MAC address 116, in accordance with an illustrative embodiment.

As shown in FIG. 5, the probe request 120 includes, among other things, a frame control field 502, a duration field 504, a receiver field 506 (shown as "DA 506"), a sender field 508 (shown as "SA 508"), a BSS ID field 510, and a seq-ctl field 512 that collectively forms a fixed MAC header 514. The probe request 120 includes a frame body 516 that follows the MAC header 514 and that precedes a frame check sequence 518. The frame body 516 includes, in some embodiments, the MAC Pool identifier 114 or a MAC Pool address (shown as "MAC Pool ID 114") and a token 520 as extension fields to the frame body 516. In some embodiments, the MAC Pool identifier 114 or the MAC Pool address is structured in the frame body 516 as a TLV ("Type Length Value" field) shown in FIG. 5 as "Type" 522, "Length" 524, and "Value" 526 in which the Value field 526 includes the MAC Pool identifier 114 or the MAC Pool address 114. To this end, the length field 524 specifies a length of the MAC Pool identifier 114 or the MAC Pool address 114. In some embodiments, the length field 524 specifies the length of the MAC Pool identifier 114 or the MAC Pool address 114 in bits. In other embodiments, the length field 524 specifies the length of the MAC Pool identifier 114 or the MAC Pool address 114 in octets. The Type field 522, in some embodiments, specifies that the field 528 is a MAC Pool ID field. In some embodiments, the MAC Pool ID field comprises the type field 522 and the MAC Pool identifier or address (and not a length value).

To resolve or reduce possible collision of two different clients trying to reserve a same MAC address, the probe request 120 includes the token field 520 to identify a particular MAC request and confirmation exchange. As shown in FIG. 5, the token field 520 includes a type field 530, a length field 532, and a value field 534. In some embodiments, the token value (e.g., used in the value field 534) is generated, as a string, or a hash value of, a user ID of the device. In some embodiments the token value is generated, as a string, or a hash value of, a user ID of the device combined with another parameter, e.g., a time stamp or a randomly generated sequence. Other mechanisms of generating a token may be used, for example, by random selection.

In some embodiments, an access-point probe request is sent from the access point 106 to the client wireless device 108, for example, to indicate that a request for a given MAC address requested by the client device 108 is not available (e.g., has been assigned to another client device). The access-point probe request, in some embodiments, is structured in accordance with a probe request as shown and described in relation to FIG. 5. Here, the requested MAC address in the probe request 120 is inserted in the receiver (DA) field 508 and a token value in the probe request 120 is inserted in the token field 520. The MAC address in the receiver (DA) field 508 and token value in the token field 520 is used by the client device 108 to determine that it is desired recipient of the access-point probe request. To this end, the client device 108 can submit another probe request 120 to request of a different dynamically assignable MAC address broadcasted in the beacon frame 112 (or management frame).

Figure 6:
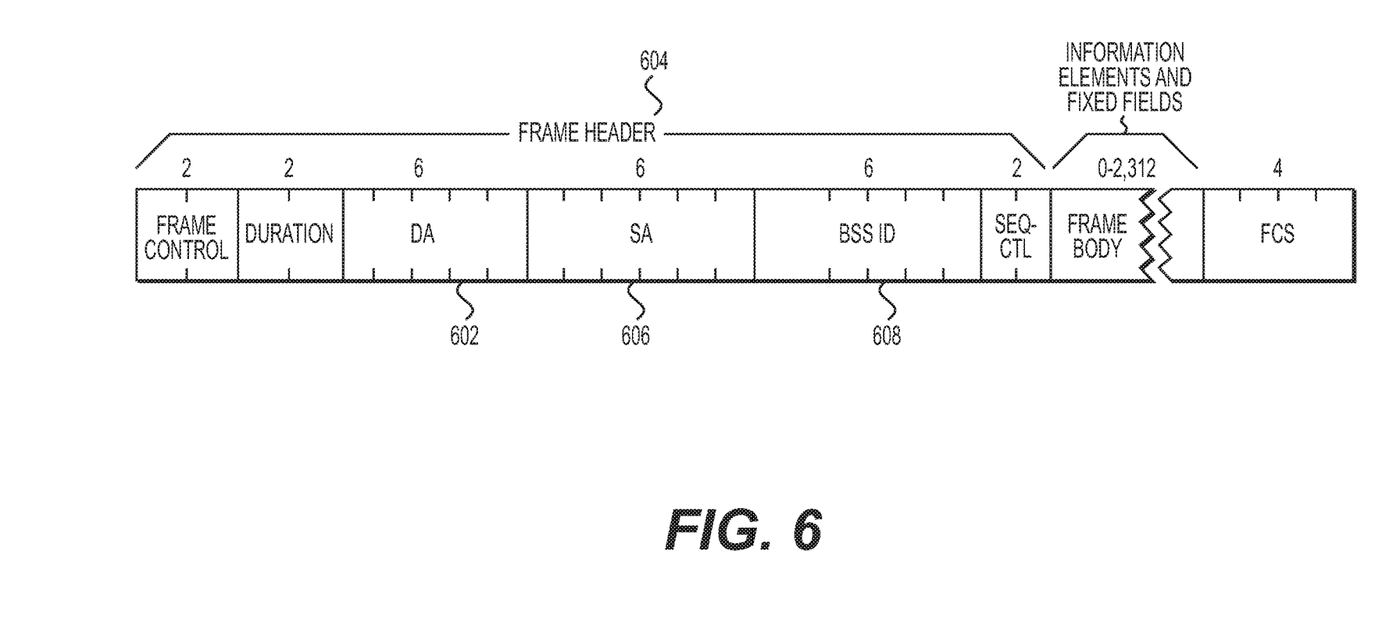
FIG. 6 is a diagram of an example management frame generated by a client wireless device to request assignment of a given broadcasted dynamically assignable MAC address, in accordance with another illustrative embodiment.

Management Frame to Request or Response to Assignment of a Dynamically Assignable MAC Address FIG. 6 is a diagram of an example management frame 600 generated by a client wireless device 108 to request assignment of a given broadcasted dynamically assignable MAC address 116, in accordance with another illustrative embodiment.

The management frame may be used to broadcast MAC Pool identifier 114 (or MAC Pool address) and the one or more dynamically assignable MAC address 116, as described in relation to FIG. 1. As shown in FIG. 6, for frames from the access point to the client device 108, the receiver (DA) field 602 in the frame header 604 includes the dynamically assignable MAC address 116, and the sender (SA) field 606 and the BSSID field 608 includes the MAC address of the access point 106. For frames from the client device 108 to the access point 106, the receiver (DA) field 602 in the frame header 604 includes the access point MAC address, and the sender (SA) field 606 includes the dynamically assigned MAC address 116 (that is, a dynamically assignable MAC address that has been assigned to a client device).

Example Dynamic MAC Advertisement Operation

In an embodiment, the access point broadcasts a sub-set of unique local MAC addresses available in a beacon frame in a dynamic MAC advertisement. Client devices can select one of the broadcasted dynamically assignable MAC addresses in the beacon, and after a short observation, the client device use the selected MAC address to transmit a probe (e.g., a probe request).

Figure 7:
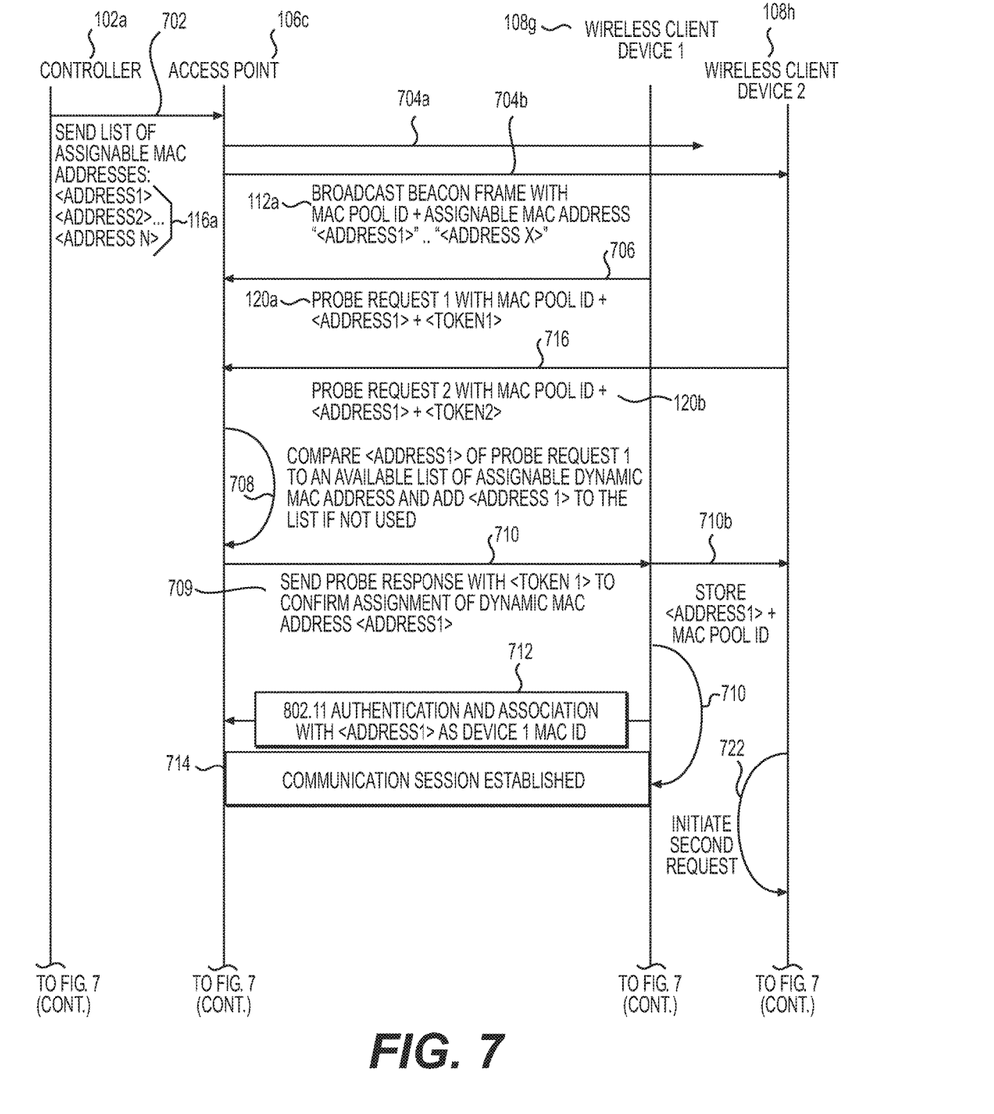
FIG. 7 is a diagram illustrating an example MAC leasing and allocation operation, in accordance with an illustrative embodiment.

FIG. 7 is a diagram illustrating example MAC leasing and allocation operation, in accordance with an illustrative embodiment. As shown in FIG. 7, an access point 106 (shown as "Access Point 106*c*") and dynamic MAC controller (shown as "Controller 102*a*") operate together to lease dynamic MAC addresses 116 to a respective first and second client wireless devices (shown as "Wireless Client Device 1 108*g*" and "Wireless Client Device 2 108*h*").

As shown in FIG. 7, the controller 102*a* sends (702) a set of dynamically assignable MAC addresses 116 (shown as "Assignable MAC addresses" 116*a*) to the access point 106*c*. In some embodiments, the controller 102*a* provides the set of dynamically assignable MAC addresses 116*a* to the access point 106*c* on a periodic basis. In other embodiments, the controller 102*a* provides the set of dynamically assignable MAC addresses 116*a* to the access point 106*c* when a request is sent to the controller 102 from the access point 106*c*.

During normal operation, the access point 106*c* broadcasts a beacon frame 112 (shown as "beacon frame 112*a*"), as discussed in relation to FIG. 1, that includes a MAC Pool identifier (shown as "MAC Pool ID") and one or more dynamically assignable MAC address (shown as "<Address1> . . . <Address x>"). The broadcasted dynamically assignable MAC address "<Address1> . . . <Address x>" may include in whole, in part, the list of addresses 116*a* (shown as "<Address1><Address 2> . . . <Address n>"). In FIG. 7, the broadcasted beacon frame is shown to be received by "Device 1" 108*g* via arrow 704*a* and shown to be received by "Device 2" 108*h* via arrow 704*b*.

In response to the beacon frame 112*a*, and as shown in FIG. 7, each of "Device 1" 108*g* and "Device 2" 108*h* responded to the beacon frame 112*a* with a probe request 120 (shown as probe request 120*a* and probe request 120*b*). In this example, and as shown in FIG. 7, each of "Device 1" 108*g* and "Device 2" 108*h* requests for the same dynamically assignable MAC address, and "Device 1" 108*g* transmits the probe request 120*a* prior to "Device 2" 108*h* transmitting the probe request 120*b*. As shown in FIG. 7, "Device 1" 108*g* transmits (706) a probe request 120, (shown as "Probe Request 1" 120*a*), which includes the MAC Pool identifier transmitted in beacon frame 112*a*, a dynamically assignable MAC address ("<Address 1>"), and a "<Token 1>" that is associated with the "Device 1" 108*g*, and "Device 2" 108*h* transmits (716) a probe request 120*b*, which includes the same MAC Pool identifier and dynamically assignable MAC address ("<Address 1>") as probe request 120*a*, but with a different token (shown as "<Token 2>" that is associated with "Device 2" 108*h*.

The access point 106*c*, upon receiving the probe request 120*a*, which is shown in this example as being received first, compares (708*a*) the MAC address associated with the probe request 120*a* to an available list of assignable dynamic MAC addresses. Upon determining that that the probe request 120*a* includes an unassigned dynamically assignable MAC address (that is, the MAC address in the probe request is in the available list of assignable dynamic MAC addresses or not in the list of already assigned dynamic MAC addresses), the access point 106*c* adds the unassigned dynamically assignable MAC address (i.e., "<Address 1>") associated with the received probe request 120a to the available list of assignable dynamic MAC addresses. In some embodiments, the access point 106c includes an expiration time for the newly assigned
MAC address in the available list of assignable dynamic MAC addresses. The expiration time may be maintained in a separate list or as an event in the access point. Example of expiration times includes about 15 minutes, about 30 minutes, about 45 minutes, about 1 hour, about 2 hours, about 3 hours, about 4 hours, about 5 hours, about 6 hours, about 7 hours, about 8 hours, about 9 hours, about 10 hours, about 11 hours, about 12 hours, or more. In some embodiments, the expiration time is configurable by a network administrator. In some embodiment, the expiration time is first set to a default value (e.g., about 1 minute, about 2 minutes, about 3 minutes, about 4 minutes, about 5 minutes, or more) and is extended upon the client wireless device being authenticated onto the network.

In addition, upon determining that the probe request 120a includes an unassigned dynamically assignable MAC address, the access point 106c transmits (708b) to "Device 1" 108g a probe response 710 that confirms the assignment of the dynamically assignable MAC address "<Address 1>" to "Device 1" 108g. The probe response 709 includes the token "<Token1>", the dynamically assigned MAC address, and the MAC Pool identifier. The probe response 710, in addition to serving as a confirmation of assignment for "Device 1" 108g, also serves a denial of assignment to "Device 2" 108h.

Each of the client wireless device, upon sending a probe request, monitors for a probe response from the access point with i) the MAC Pool identifier and a dynamically assignable MAC address in their respective probe request and ii) a token value. If the MAC Pool identifier and a dynamically assignable MAC address in its respective probe request includes a token matching its transmitted token, the client wireless device treats its request as being accepted and configures its network interface with the dynamically assignable MAC address. In some embodiments, the client wireless device also configures its network interface with the MAC Pool identifier. If the token in the probe response does not match the transmitted token, the client wireless device treats its request for the dynamically assignable MAC address as being denied and resends a new probe request for a different dynamically assignable MAC address.

As shown in FIG. 7, the "Device 1" 108g, in response to receiving (708b) the probe response 709, determines that its request is accepted and stores (710) the dynamically assigned MAC address and MAC Pool identifier and initiates (712) authentication and association session with the access point 106c to gain access to the network. Upon a successful authentication, a communication session (714) is established between "Device 1" 108g and the access point 106c. The "Device 1" 108g is now able to roam within the MAC usage domain using the assigned MAC address "<Address 1>".

In some embodiments, the lease confirmation includes a lease period. Within the lease period, the client device can freely roam using the allocated MAC within the MAC usage domain identified by the MAC Pool identifier. In some embodiments, the client device can renew a lease of the assigned MAC address before the lease expired. After expiration, dynamically assigned MAC addresses are returned to available pool of dynamically assignable MAC addresses and redistributed by the controller 102 to the access points 106. Client device with expired leased MAC address will be ejected from the network.

The "Device 2" 108h, in response to receiving (708c) the probe response 709, determines that its request is denied and initiates (722) another request and sends (726) a new probe request (shown as "Probe Request 3"120c) with another dynamically assignable MAC address (shown as "<Address 2>" selected from the broadcasted beacon frame 112a. The "Device 2" 108h, upon receiving (727) a probe response from the access point that includes the token "<Token2>" with the MAC Pool Identifier and the requested dynamically assignable MAC address, treats the request as being approved and stores (728) the MAC Pool Identifier and the requested dynamically assignable MAC address and proceeds to authenticate (730) and associate itself with the access point 106c using the MAC address "<Address 2>".

It should be appreciated that operation of "Device 1" 108g and "Device 2" 108h may substantially overlap with one another.

In some embodiments, the reply from the access point 106 may be an 802.11 frame for the reservation and confirmation of the exchange. Other clients scanning for available MAC address would not use a MAC address provided in this frame, and access points will not include this MAC address in a subsequent beacon frame.

In other embodiments, control frames like CTS/ACK ("clear to send/acknowledge") is used as confirmation from the access point for requests initiate using RTS ("request to send") frame.

Figure 8:
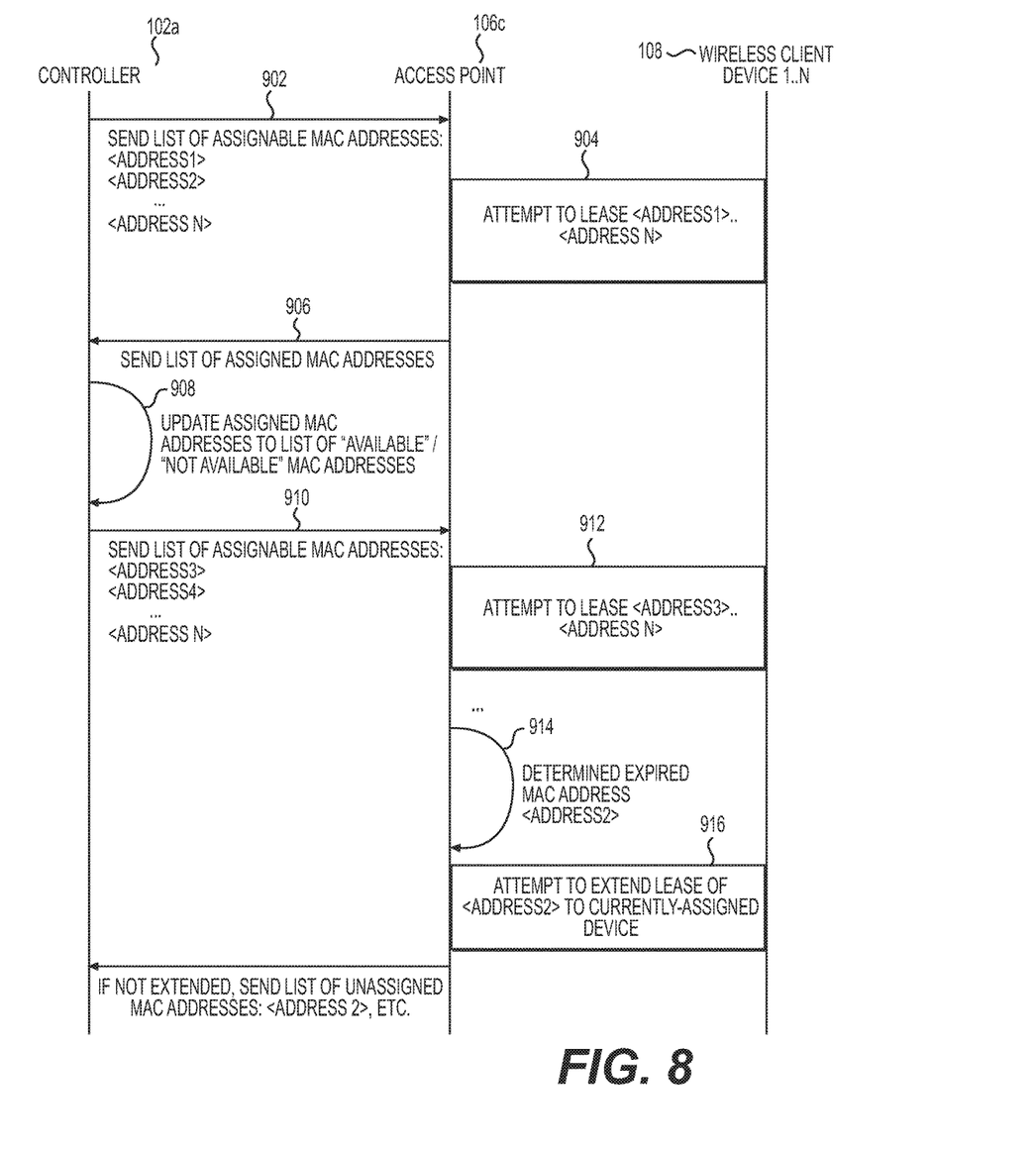
FIG. 8 is a diagram illustrating example MAC leasing and allocation operation to manage expiration of assigned dynamic MAC addresses, in accordance with an illustrative embodiment.

FIG. 8 is a diagram illustrating example operations between the access point 106c and dynamic MAC controller 102a of FIG. 7 to manage expiration of assigned dynamic MAC addresses, in accordance with an illustrative embodiment.

As shown in FIG. 8, the controller 102a sends (902) to the access point 106c a list of assignable MAC addresses from a pool of available MAC addresses maintained by the controller 102a. The access point 106c attempts (904) to lease the available dynamically assignable MAC addresses, e.g., as described in relation to FIG. 7. After a pre-defined time period, or with each instance that a MAC address is assigned by the access point 106c, the access point 106c sends (906) a list of one or more assigned MAC addresses to the controller 102a. The controller 102a updates (908) the list of available dynamically assignable MAC addresses and/or the list of unavailable dynamically assignable MAC addresses with the received list of one or more assigned MAC addresses. Subsequently, the controller 102a sends (910) to the access point 106c a second list of assignable MAC addresses from a pool of available MAC addresses maintained by the controller 102a, and the access point 106c attempts (912) to lease to lease the available dynamically assignable MAC addresses.

After some time, the access point 106c, in some embodiments, determines (914) that one or more assigned MAC addressed have expired. As shown in FIG. 8, the access point 106c, upon determining a dynamically assigned MAC address having expired, or is about expire, attempts (916) to extend the lease of the assigned MAC address (shown as "<Address 2>") to the presently assigned client device. If the lease is not extended, the access point 106c sends (918) a list of one or more unassigned dynamically assignable MAC addresses to the controller 102, which updates the list of available dynamically assignable MAC addresses and/or the list of unavailable dynamically assignable MAC addresses maintained thereat.

In some embodiments, the access point 106c does not attempt to extend the lease and rather allows the lease to lapse—at which time, the client device is configured to request for a new lease.

Figure 9:
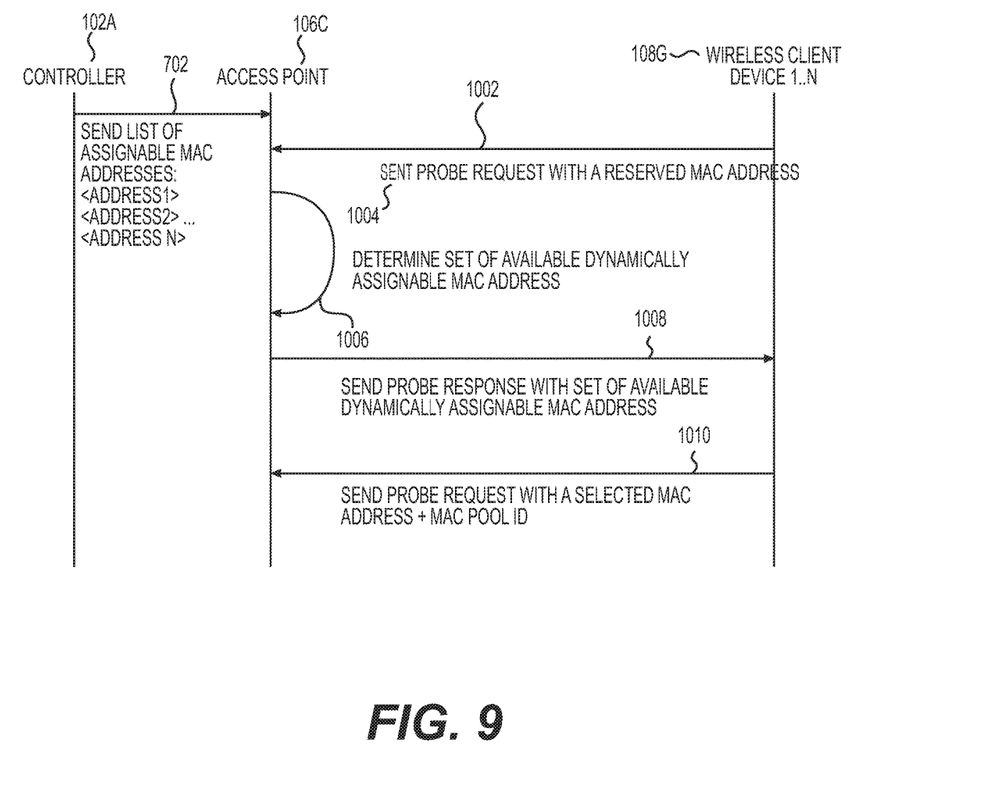
FIG. 9 is a diagram illustrating an example MAC reservation operation, in accordance with an illustrative embodiment.

FIG. 9 is a diagram illustrating an example MAC reservation operation, in accordance with an illustrative embodiment. The MAC reservation operation may be used, independent of, or in combination, with the MAC leasing and allocation operations as described in relation to FIG. 7 or 8.

In this embodiments, to reduce scanning dwell time wait for a beacon frame from the access point, the access point is configured to send a beacon frame in respond to receipt of a send a probe request from a wireless client device.

As shown in FIG. 9, the wireless client device 102a sends (1002) a probe request 1004 with a reserved MAC address and a token. In some embodiments, the reserved MAC address is a null address or an address that has been assigned to a given vendor to be used for MAC address reservation. The probe request 1004, in some embodiments, triggers the access point 106c to determine (1006) a set of available dynamically assignable MAC addresses and to send (1008) a probe response that includes the set of available dynamically assignable MAC addresses and a MAC Pool address to the client wireless device 108g. The set of available dynamically assignable MAC addresses and MAC Pool identifier, in some embodiments, are inside a new IE (Information Element). In some embodiments, the probe response 1006 includes the token from the probe request 1004. In response to the probe response, the client wireless device 108g selects one of the dynamically assignable MAC addresses included in the set and send (1010) a probe request to confirm the assignment.

In other embodiments, 802.11 management frame is used instead of probe request and probe response. The use or inclusion of new management frames may facilitate issues with backward compatibility with existing probe request and probe response.

In another embodiment, in response to a probe request 1002 from the wireless client device 108g, the access point 106c determines a single available dynamically assignable MAC address and sends a probe response that includes the determined available dynamically assignable MAC address to the wireless client device 108g.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable sub-combination.

What is claimed is:

1. A method of operating a network, the method comprising:
   in the network, broadcasting, via an access point (AP), on a periodic basis, a packet comprising i) a MAC Pool identifier associated with the network and ii) one or more dynamic MAC addresses associated with the network, wherein each dynamic MAC address of the one or more dynamic MAC addresses is potentially assignable to a computing device that receives the packet;
   in response to receipt of a packet response from a given computing device, wherein the packet response includes a broadcasted dynamic MAC address of the one or more broadcasted dynamic MAC addresses, determining whether the broadcasted dynamic MAC address has been associated with and/or assigned to a network device in the network; and
   in response to the determination, (i) associating the broadcasted dynamic MAC address with the given computing device and (ii) adding the broadcasted dynamic MAC address to a list of plurality of assigned dynamic MAC addresses as an allocated dynamic MAC address assigned to the given computing device, wherein subsequent packets communicated to given computing device are based on the allocated dynamic MAC address.

2. The method of claim 1, wherein the MAC Pool identifier is a MAC address associated with a controller located in the network or is a configurable identifier that is specified by an administrator.

3. The method of claim 1, comprising:
   upon the designation of the broadcasted dynamic MAC addresses as the allocated dynamic MAC address that is associated with the given computing device, initiating an expiration counter or logging an expiration time.

4. The method of claim 1, comprising:
   upon expiration of the allocated dynamic MAC address associated with the given computing device, removing the broadcasted dynamic MAC address from the list of plurality of assigned dynamic MAC addresses.

5. The method of claim 1, wherein the packet response includes the broadcasted dynamic MAC address and a token parameter, the method comprising:
   in response to receipt of the packet request from a second computing device, transmitting, via the access point, the token parameter with the broadcasted dynamic MAC address, wherein said transmission confirms an association between the broadcasted dynamic MAC address and the given computing device that transmitted the token parameter in the packet response.

6. The method of claim 1, wherein subsequent packets communicated to the given computing device, across a second access point, are based on the allocated dynamic MAC address.

7. The method of claim 1, comprising:
   in the network, broadcasting, via a second access point, a second packet comprising i) the MAC Pool identifier associated with the network and ii) one or more dynamic MAC addresses associated with the network, wherein the access point is located at a first location and the second access point is located at a second location, and wherein the first location is not the same as the second location.

8. The method of claim 1, wherein the packet response comprises a probe request.

9. The method of claim 1, wherein the network is associated with a single common SSID.

10. The method of claim 1, wherein the network is associated with a plurality of SSIDs, wherein a plurality of access points associated with the plurality of SSIDs use the MAC Pool identifier as a common identifier.

11. The method of claim 10, wherein the allocated dynamic MAC address is unique among the plurality of SSIDs.

12. The method of claim 1, comprising:
   in response to receipt of a second packet associated with a renewal of a lease of the allocated dynamic MAC address, initiating a new expiration counter or logging a new expiration time.

13. The method of claim 1, wherein a portion of the one or more dynamic MAC addresses is originally assigned by a manufacturer and is designated as a dynamic MAC address by a Registration Authority Standard Group MAC Address.

14. The method of claim 2, wherein a portion of the one or more dynamic MAC addresses is assignable, via a graphical user interface associated with the controller, by a user.

15. The method of claim 1, wherein a portion of the one or more dynamic MAC addresses is formatted according to a MAC-48 namespace.

16. A method of operating a network, the method comprising:

in the network, receiving, at a computing device, a plurality of broadcasted packets, wherein each of the plurality of broadcasted packets has been transmitted on a periodic basis and each comprises i) a MAC Pool identifier associated with the network and ii) one or more dynamic MAC addresses associated with the network;

storing, at the computing device, a dynamic MAC address of the one or more dynamic MAC addresses; and transmitting, from the computing device, to an access point associated with the network, a packet comprising the stored dynamic MAC address;

wherein, in response to receipt of the transmitted packet transmitted from the computing device, the access point determines whether the stored dynamic MAC address in the transmitted packet has been associated with and/or assigned to a network device in the network, and wherein, in response to the determination, the access point associates the stored dynamic MAC address in the transmitted packet with the computing device and adds the stored dynamic MAC address in the transmitted packet, as an allocated dynamic MAC address assigned to the computing device, to a list of a plurality of allocated dynamic MAC addresses; and wherein subsequent packets are transmitted to the computing device based on the allocated dynamic MAC address.

17. The method of claim 16, comprising:

transmitting, from the computing device, to the access point, authentication packets, wherein the authentication packets comprises the stored dynamic MAC address.

18. The method of claim 16, comprising:

transmitting, from the computing device, to a second access point, second authentication packets, wherein the second authentication packets comprises the stored dynamic MAC address.

19. The method of claim 16, wherein a portion of the one or more dynamic MAC addresses is formatted according to MAC-48 namespace.

20. An apparatus comprising:
a processor; and
a memory having instructions stored thereon, wherein execution of the instructions, cause the processor to:
broadcast, on a periodic basis, a packet comprising i) a MAC Pool identifier associated with the network and ii) one or more dynamic MAC addresses associated with the network, wherein a given dynamic MAC address of the one or more dynamic MAC addresses is potentially assignable to a computing device that receives the packet;
in response to receipt of a packet response from a given computing device, wherein the packet response includes a broadcasted dynamic MAC address of the one or more broadcasted dynamic MAC addresses, determine whether the broadcasted dynamic MAC address has been associated with or assigned to a computing device in the network; and
in response to the determination, (i)associate the broadcasted dynamic MAC address with the given computing device and (ii) adding the broadcasted dynamic MAC address to a list of plurality of assigned dynamic MAC addresses as an allocated dynamic MAC address assigned to the given computing device, wherein subsequent packets communicated to the given computing device are based on the allocated dynamic MAC address.

21. An apparatus comprising:
a processor; and
a memory having instructions stored thereon, wherein execution of the instructions, cause the processor to:
receive a plurality of broadcasted packets that has been transmitted, wherein each of the plurality of broadcasted packets has been transmitted on a periodic basis and each comprises i) a MAC Pool identifier associated with a network and ii) one or more dynamic MAC addresses associated with the network,.
store a dynamic MAC address of the one or more dynamic MAC addresses; and
transmit, to an access point associated with the network, a packet comprising the stored dynamic MAC address;
wherein, in response to receipt of the transmitted packet transmitted from the apparatus, the access point determines whether the stored dynamic MAC address in the transmitted packet has been associated with and/or assigned to a network device in the network, and
wherein, in response to the determination, the access point associates the stored dynamic MAC address in the transmitted packet with the apparatus and adds the stored dynamic MAC address in the transmitted packet, as an allocated dynamic MAC address assigned to the apparatus, to a list of a plurality of allocated dynamic MAC addresses; and
wherein subsequent packets are transmitted to the apparatus based on the allocated dynamic MAC address.

* * * * *